(12) United States Patent
Takano

(10) Patent No.: US 6,587,939 B1
(45) Date of Patent: Jul. 1, 2003

(54) INFORMATION PROCESSING APPARATUS PROVIDED WITH AN OPTIMIZED EXECUTABLE INSTRUCTION EXTRACTING UNIT FOR EXTENDING COMPRESSED INSTRUCTIONS

(75) Inventor: Hiroyuki Takano, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/482,262

(22) Filed: Jan. 13, 2000

(30) Foreign Application Priority Data

Jan. 13, 1999 (JP) ............................. 11-006920
Jan. 11, 2000 (JP) ......................... 2000-002353

(51) Int. Cl.[7] ........................... G06F 9/305; G06F 9/30; G06F 7/32
(52) U.S. Cl. ................... 712/210; 712/223; 712/300; 712/224; 707/101
(58) Field of Search ............... 712/223, 227, 712/245, 209, 224, 210, 300; 717/174, 110, 141, 175, 163, 107; 707/6, 100, 203, 101, 331; 341/51, 107

(56) References Cited

U.S. PATENT DOCUMENTS

| | | | |
|---|---|---|---|
| 4,835,679 A | 5/1989 | Kida et al. | 364/200 |
| 5,717,394 A | * 2/1998 | Schwartz et al. | 341/107 |
| 5,768,597 A | * 6/1998 | Simm | 717/174 |
| 5,790,874 A | 8/1998 | Takano et al. | 395/750.03 |
| 5,819,097 A | * 10/1998 | Brooks et al. | 717/141 |
| 5,838,963 A | * 11/1998 | Griffiths | 707/6 |
| 6,131,192 A | * 10/2000 | Henry | 717/175 |

OTHER PUBLICATIONS

Intel Architecture Optimization Manual, Order No. 242816–003, Intel Corporation, 1997, pp. 1–2 through 3–35.

TMS320C3x, Digital Signal Processing Solutions, Texas Instruments, 1997, pp. 13–1 through 13–166.

* cited by examiner

Primary Examiner—Daniel H. Pan
(74) Attorney, Agent, or Firm—Foley & Lardner

(57) ABSTRACT

An information processing apparatus is provided with a executable instruction extracting unit which is reconfigured by means of a executable instruction extracting unit reconfiguration unit with reference to a compressed/executable instruction correspondence table optimized for the respective executable program, which has been made up with an compressed instruction. The compressed instruction is extended into the corresponding executable instructions by means of the executable instruction extracting unit as reconfigured.

12 Claims, 22 Drawing Sheets

FIG.2

| compless_inst_1  rA, rB |
|---|

```
sll   rA, rA, 16
lw    rB, 0 (rA)
```

| compless_inst_3  rA, rB |
|---|

```
mult  rA, rB,  rA
sra   rA, rA, 15
```

FIG.3

L110:
    compless_inst_1   r4, r7 lw        r3, 0 (r5)

addu     r2, r3, r7 compless_inst_1   r2, r3 addu     r3, r3, r2 compless_inst_1   r9, r3 addu     r3, r3, r9 compless_inst_3   r4, r7 bnel      r4, r0, L112 addu     r2, r11, r0

L112 :
    compless_inst_3   r3, r7

FIG.4A

```
module expander(clock, reset, compress_code, compress_code_valid, expand_code)

//including a compressed/executable instruction
    include"compress_expand_table"

//correspondence table
input           clock :
input           reset :              //initialization
input [31:0]    compress_code :      //compressed instruction
input           compress_code_valid : //compressed instruction valid
output [31:0]   expand_code :        //executable instruction //declaration of F/Fs
reg   [31:0]    compress_code_reg :  //latching a compressed instruction
reg             expand_code_2 :      //outputting the executable instruction 2

//declaration of wirings
wire            expand_code_1 :      //outputting the executable instruction 1
//driving F/Fs in synchronism with clocks
always @ (posedge clock) begin //latching the compressed instruction for the executable instruction 2
  if(reset) begin
    compress_code_reg <=#1 32' h00000000 ;
  end
  else if(compress_code_valid) begin
    compress_code_reg <= #1 compress_code ;
  end //outputting the executable instruction 2
  if(reset) begin
    expand_code_number <=#1 1'b0 ;
  end
  else begin
    expand_code_2 <=#1 compress_code_valid ;
  end end
```

FIG.4B

```
//the executable instruction 1 is output when the compress_code is fetched
assign expand_code_1 = compress_code_valid ;

//output of the executable instruction (from function)
assign expand_code = function_expand (compress_code,  //judged from compressed instruction,
                                       expand_code_1,  //output of the executable instruction 1 and
                                       expand_code_2) ;//output of the executable instruction 2

//implementation of the executable instruction output function (the sequential circuit)
function [31:0]   function_expand ;
input    [31:0]   compress_code ;
input             expand_code_1 ;
input             expand_code_2 ;
case({compress_code, expand_code_2, expand_code_1})
  {COMPRESS_CODE_A, 2'b1} : function_expand = EXPAND_CODE_A_1 ;
  {COMPRESS_CODE_A, 2'b2} : function_expand = EXPAND_CODE_A_2 ;
  {COMPRESS_CODE_C, 2'b1} : function_expand = EXPAND_CODE_C_1 ;
  {COMPRESS_CODE_C, 2'b2} : function_expand = EXPAND_CODE_C_2 ;
encase
endfunction endmodule
```

FIG.4C

{
parameter COMPRESS_CODE_A =(bit-pattern of the compressed instruction A);
parameter EXPAND_CODE_A_1 = (bit-pattern of the executable instructions 1 corresponding to the compressed instruction A);
parameter EXPAND_CODE_A_2 = (bit-pattern of the executable instructions 2 corresponding to the compressed instruction A);
parameter COMPRESS_CODE_C = (bit-pattern of the compressed instruction C);
parameter EXPAND_CODE_C_1 = (bit-pattern of the executable instructions 1 corresponding to the compressed instruction C);
parameter EXPAND_CODE_C_2 = (bit-pattern of the executable instructions 2 corresponding to the compressed instruction C);
}

```
L110:
    sll    r2, r2, 16
    lw     r3, 0 (r2)
    lw     r3, 0 (r5)
    addu   r2, r3, r7
    sll    r2, r2, 16
    lw     r3, 0 (r2)
    addu   r3, r3, r2
    sll    r9, r9, 16
    lw     r3, 0 (r9)
    addu   r3, r3, r9
    mult   r4, r7, r4
    sra    r4, r4, 15
    bnel   r4, r0, L112
    addu   r3, r11, r0
L112:
    mult   r3, r7, r3
    sra    r3, r3, 15
```

501 count{sll r2, r2 16 ; lw r3, 0(r2)}= 1........(a)

count{lw r3, 0(r2) ; lw r3, 0, (r5)}= 1 count{lw r3, 0(r5) ; addu r2, r3, r7}= 1 count{addu r2, r3, r7 ; sll r2, r2, 16}= 1 count{sll r2, r2 16 ; lw r3, 0(r2)}= 2........(b)

count{lw r3, 0(r2) ; addu r3, r3, r2}= 1 count{addu r3, r3, r2 ; sll r9, r9, 16}= 1 count{sll r9, r9, 16 ; lw r3, 0(r9)}= 1........(c)

count{lw r3, 0(r9) ; addu r3, r3, r9}= 1 count{addu r3, r3, r9 ; mult r4, r7, r4}= 1 count{mult r4, r7 r4 ; sra r4, r4, 15}= 1 count{sra r4, r4, 15 ; bnel r4, r0, offset}= 1 count{bnel r4, r0, offset ; addu r3, r11, r0}= 1 count{addu r3, r11, r0 ; mult r3, r7, r3}= 1 count{mult r3, r7, r3 ; sra r3, r3, 15}=1

FIG.10 compless_inst_0 r2, r3 sll r2. r2, 16
lw r3, 0 (r2)

L110:
```
        compless_inst_0  r2, r3 lw       r3, 0 (r5)

addu     r2, r3, r7 compless_inst_0  r2, r3 addu     r3, r3, r2 sll      r9, r9  16 lw       r3, 0(r9)

addu     r3, r3, r9 mult     r4, r7, r4 sra      r4, r4, 15 bnel     r4, r0, L112 addu     r3, r11, r0
L112:
        mult     r3, r7, r3 sra      r3, r3, 15
```

```
L110:
1    sll     r2, r2, 16
     lw      r3, 0 (r2)
3    lw      r3, 0 (r5)
     addu    r2, r3, r7
5    sll     r2, r2, 16
     lw      r3, 0 (r2)
7    addu    r3, r3, r2
     sll     r9, r9, 16
9    lw      r3, 0 (r9)
     addu    r3, r3, r9
11   mult    r4, r7, r4
     sra     r4, r4, 15
13   bnel    r4, r0, L112
     addu    r3, r11, r0

L112:
     mult    r3, r7, r3
     sra     r3, r3, 15
```

502

=> count{sll rA, rA, 16 ; lw rB, 0(rA)} = 1 .....(a)

=> count{lw rA, 0(rB) ; lw rA, 0(rD)} = 1

=> count{lw rA, 0(rB) ; addu rC, rA, rD} = 1

=> count{addu rA, rB, rC ; sll rA, rA, 16} = 1

=> count{sll rA, rA 16 ; lw rB, 0(rA)} = 2 .....(b)

=> count{lw rA, 0(rB) ; addu rA, rA, rB} = 1 .....(d)

=> count{addu rA, rA, rB ; sll rC, rC, 16} = 1

=> count{sll rA, rA, 16 ; lw rB, 0(rA)} = 3 .....(c)

=> count{lw rA, 0(rB) ; addu rA, rA, rB} = 2 .....(e)

=> count{addu rA, rA, rB ; mult rC, rD, rC} = 1

=> count{mult rA, rB rA ; sra rA, rA, 15} = 1 ...(f)

=> count{sra rA, rA, 15 ; bnel rA, rB, offset} = 1

=> count{bnel rA, rB, offset ; addu rC, rD, rB} = 1

=> count{addu rA, rB, rC ; mult rA, rB, rA} = 1

=> count{mult rA, rB, rA ; sra rA, rA, 15} = 2 .....(g)

FIG.13 compless_inst_1 rA, rB sll rA, rA, 16
lw  rB, 0(rA)

compless_inst_3 rA, rB mult rA, rB, rA
sra  rA, rA, 15

FIG.14 compless_inst_2 rA, rB lw   rA, 0(rB)
addu rA, rA, rB

FIG.15

L110:
    compless_inst_1  r2, r3 lw        r3, 0 (r5)

addu     r2, r3, r7 compless_inst_1  r2, r3 addu     r3, r3, r2 compless_inst_1  r9, r3 addu     r3, r3, r9 compless_inst_3  r4, r7 bnel     r4, r0, L112 addu     r2, r11, r0

L112 :
    compless_inst_3  r3, r7

FIG.17

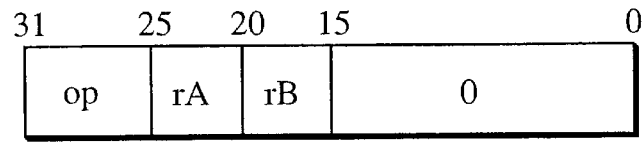

| 31 | 25 | 20 | 15 | 0 |
|----|----|----|----|---|
| op | rA | rB |  0 |   |

FIG.18

```
L110:
    sll    r4, r4, 16
    lw     r7, 0 (r4)    =>OK    count{sll  rA, rA, 16 ; lw   rB, 0(rA)}= 1
    lw     r3, 0 (r5)    =>NG
    addu   r2, r3, r7    =>NG
    sll    r2, r2, 16    =>NG
    lw     r3, 0 (r2)    =>OK    count{sll  rA, rA  16 ; lw   rB, 0(rA)}= 2
    addu   r3, r3, r2    =>OK    count{lw  rA, 0(rB) ; addu  rA, rA, rB}= 1
    sll    r9, r9, 16    =>NG
    lw     r3, 0 (r9)    =>OK    count{sll  rA, rA  16 ; lw   rB, 0(rA)}= 3
    addu   r3, r3, r9    =>OK    count{lw  rA, 0(rB) ; addu  rA, rA, rB}= 2
    mult   r4, r7, r4    =>NG
    sra    r4, r4, 15    =>OK    count{mult rA, rB  rA ; sra  rA, rA, 15}= 1
    bnel   r4, r0, L112  =>OK    count{sra  rA, rA, 15 ; bnel rA, rB, offset}= 1
    addu   r2, r11, r0   =>NG L112:
    mult   r3, r7, r3    =>NG
    sra    r3, r3, 15    =>OK    count{mult rA, rB, rA ; sra rA, rA, 15}=2
```

```
L110:
    lh      r7, 0(r4)
    lh      r3, 0(r5)
    mult    r2, r7, r6
    sh      r12, 0(r5)

addiu   r2, r2, 16384
    sra     r2, r2, 15
    sll     r2, r2, 16
    sra     r2, r2, 16 addu    r11, r3, r2
    addiu   r2, r11, 0x8000
    slti    r2, r2, 1 bnel    r2, r0, L112
    addu    r2, r11, r0 bgtzl   r11, L112
    addiu   r2, r0, 32767 addiu   r2, r0, -32768
L112:
    sll     r12, r2, 16
    mult    r3, r7, r3
    sra     r12, r12, 16 addiu   r2, r3, 16384
    sra     r2, r2, 15
    sll     r2, r2, 16
    sra     r2, r2, 16 addu    r11, r6, r2
    addiu   r2, r11, 0x8000
    slti    r2, r2, 1 bnel    r2, r0, L114
    addu    r2, r11, r0 bgtzl   r11, L114
    addiu   r2, r0, 32767 addiu   r2, r0, -32768
L114:
    sll     r6, r2, 16
    sra     r6, r6, 16
    addiu   r4, r4, 2
    slt     r3, r4, r14
    bne     r3, r0, L110
    addiu   r5, r5, 2
    jr      ra
    nop
```

(B) 113

```
L110:
    lh      r7, 0(r4)
    lh      r3, 0(r5)
    mult    r2, r7, r6
    sh      r12, 0(r5)

cadiss  r2, r2 csltad  r2, r11, r3 cbnela  r2, r11, L112 cbgzla  r11, r2, L112 addiu   r2, r0, -32768
L112:
    sll     r12, r2, 16
    mult    r3, r7, r3
    sra     r12, r12, 16 cadiss  r2, r3 csltad  r2, r11, r6 cbnela  r2, r11, L114 cbgzla  r11, r2, L114 addiu   r2, r0, -32768
L114:
    sll     r6, r2, 16
    sra     r6, r6, 16
    addiu   r4, r4, 2
    slt     r3, r4, r14
    bne     r3, r0, L110
    addiu   r5, r5, 2
    jr      ra
    nop
```

FIG.21

| PATTERN | OCCURRENCE FREQUENCY |
|---|---|
| addiu   rA, rB, 16384<br>sra     rA, rA, 15<br>all     rA, rA, 16<br>sra     rA, rA, 16 | 2 |
| addu    rB, rC, rA<br>addiu   rA, rB, 0x8000<br>slti    rA, rA, 1 | 2 |
| bnel    rA, r0, labelC<br>addu    rA, rB, r0 | 2 |
| bgtzl   rA, labelC<br>addiu   rB, r0, 32767 | 2 |

FIG.22A

```
┌─────────────────────────────┐
│ compressed instruction      │
├─────────────────────────────┤
│ executable instruction sequence │
└─────────────────────────────┘

┌─────────────────────────────┐
│ cadiss  rA, rB              │
├─────────────────────────────┤
│    addiu   rA, rB, 16384    │
│    sra     rA, rA, 15       │
│    sll     rA, rA, 16       │
│    sra     rA, rA, 16       │
├─────────────────────────────┤
│ csltad  rA, rB, rC          │
├─────────────────────────────┤
│    addu    rB, rC, rA       │
│    addiu   rA, rB, 0x800    │
│    slti    rA, rA, 1        │
├─────────────────────────────┤
│ cbnela  rA, rB, labelC      │
├─────────────────────────────┤
│    bnel    rB, r0, labelC   │
│    addu    rA, rB, 0        │
├─────────────────────────────┤
│ cbgzla  rA, rB, labelC      │
├─────────────────────────────┤
│    bgtzl   rA, labelC       │
│    addiu   rB, r0, 32767    │
└─────────────────────────────┘
```

FIG.22B

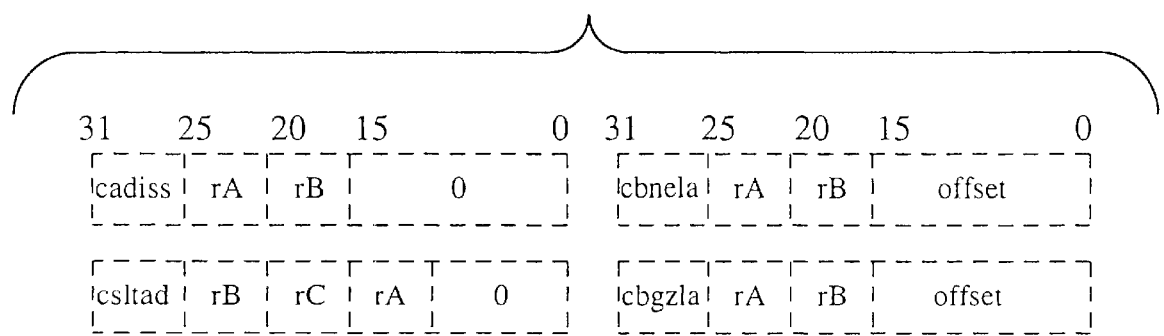

INFORMATION PROCESSING APPARATUS PROVIDED WITH AN OPTIMIZED EXECUTABLE INSTRUCTION EXTRACTING UNIT FOR EXTENDING COMPRESSED INSTRUCTIONS

BACKGROUND OF THE INVENTION

1. Field of the Invention

The present invention is related to an information processing apparatus provided with an optimized executable instruction extracting unit for extending a compressed instruction into the corresponding executable instructions in accordance with the instruction code of a target executable program.

2. Description of the Related Art

In the field of control systems with embedded microcomputers, the size of instruction code in the memory of a processor can influence the production cost of the entire system. A smaller size of instruction code in the memory has an advantage in costs. The technique of compressing the executable instructions and extending the compressed instructions is one for techniques of reducing the size of instruction code in the memory.

In the case of the executable instructions, each instruction as pointed by an address register and fetched from the memory is latched by an instruction register and transferred to an instruction decoding unit through a multiplexer in order to decode the executable instructions.

On the other hand, in the case of the compressed instructions, each instruction as pointed by the address register and fetched from the memory is extended into the corresponding executable instructions and then transferred to the instruction decoding unit through the multiplexer in order to decode the executable instructions.

In accordance with "Intel Architecture Optimization Manual", 1997, Intel Corporation, a "macro-instruction" stored in the instruction memory of the processor as discussed therein is generally extended into a plurality of corresponding "micro-ops". Furthermore, in accordance with "TMS320C3x User's Guide", 1997, TEXAS INSTRUMENTS, two instructions of "MPYI3" and "ADDIY3" for example are compressed as a compressed instruction "MPYI3| |ADDIY3" by imposing restrictions upon the usage such as the restrictions upon the usage the range of the register number available within the register field in the instruction format.

Such a compressed instruction of this kind is generated by compressing an instruction sequence which frequently occurs in the instruction codes of many application programs. However, in the actual case, there are a variety of application programs. Namely, while the compressed instruction set as defined by one processor is effective for a specific type of application program, it frequently becomes ineffective for another type of application program.

In order to improve the shortcomings, it has been contemplated to change the processor for the respective application program under question in order to make use of the compressed instruction set as optimized for the application program. However, it is ineffective to use different processors for different application programs. This is because the programmers are requested to understand the basic architecture of the processor and the software development environment each time as a new processor is employed. On the other hand, it is frequently the case that there is no processor available supporting the compressed instructions which a user desires. This is because many processors are designed in order to support the compressed instructions suitable for major application programs of which a substantial output of copies are expected.

As explained above, in the case of the prior art information processing apparatuses, the compressed instruction set is fixedly defined for each system. For this reason, while the compressed instruction set as defined in the system is effective for a specific type of application program, it becomes ineffective for another type of application program. In this case, there is the disadvantage that the use of compressed instructions can no longer improve the performance of the system.

SUMMARY OF THE INVENTION

It is an object of the present invention to provide an information processing apparatus having a compact storage region required of an executable program with a reduced number of instructions constituting the executable program.

Particularly, the information processing apparatus in accordance with the present invention is characterized by provision of a executable instruction extracting unit for extending a compressed instruction into a plurality of corresponding executable instructions, and a reconfiguration unit for reconfiguring and optimizing the executable instruction extracting unit suitable for the executable program.

In accordance with the present invention, the executable instruction extracting unit is reconfigured for the respective target program so that the number of the constituent instructions can be suppressed, resulting in compaction of the storage region for storing the target program.

BRIEF DESCRIPTION OF THE DRAWINGS

FIG. 2 shows an exemplary table of a compressed/executable instruction correspondence table.

FIG. 3 shows an example of assemble code corresponding to the executable object code as illustrated in FIG. 1.

FIGS. 4A–4C show an example of a executable instruction extracting unit.

FIG. 9 illustrates an assembler source file and instruction sequence occurrence frequency data as illustrated in FIG. 8.

FIG. 10 shows an example of the compressed/executable instruction correspondence table as illustrated in FIG. 8.

FIG. 12 illustrates other examples of the assembler source file and instruction sequence occurrence frequency data as illustrated in FIG. 8.

FIG. 13 shows another example of the compressed/executable instruction correspondence table as illustrated in FIG. 8.

FIG. 14 shows an example of the instruction sequence which is not compressed as a compressed instruction.

FIG. 15 shows another example of the assembler source file corresponding to the executable object code as compressed.

FIG. 17 shows an example of the instruction sequence pattern templates as illustrated in FIG. 16.

FIG. 18 illustrates an example of the assembler source file corresponding to the executable object code as illustrated in FIG. 16 and an example of instruction sequence occurrence frequency data as illustrated in FIG. 16.

FIG. 20 illustrates an example of an assembler source file as illustrated in FIG. 19 and an example of assembler source code corresponding to the executable object code as compressed and generated on the basis of the assembler source file.

FIG. 21 illustrates an example of instruction sequence occurrence frequency data as illustrated in FIG. 19.

FIGS. 22A and 22B show another example of the compressed/executable instruction correspondence table as illustrated in FIG. 19.

DESCRIPTION OF THE PREFERRED EMBODIMENTS

Hereinbelow, several preferred embodiments in accordance with the present invention will be explained in conjunction with the accompanied drawings.

[EMBODIMENT 1]

Figure 1:
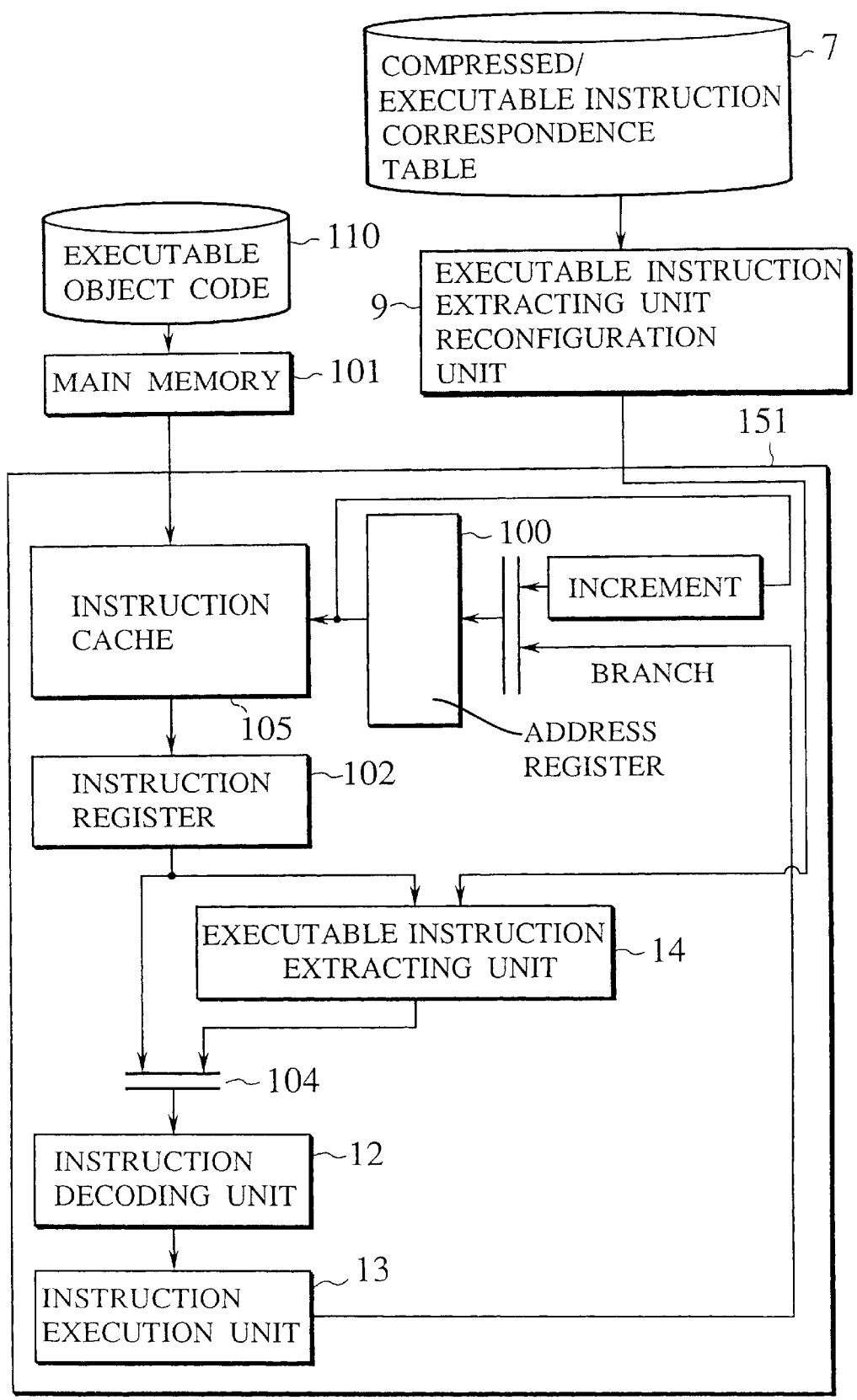
FIG. 1 is a block diagram showing an information processing apparatus in accordance with a first embodiment of the present invention.

FIG. 1 shows a block diagram showing an information processing apparatus in accordance with a first embodiment of the present invention.

In the figure, the information processing apparatus of this embodiment is provided with a processor 151 and an executable instruction extracting unit reconfiguration unit 9. The processor 151 is composed of an address register 100, an instruction register 102, a multiplexer 104, an instruction cache 105, an instruction decoding unit 12, an instruction execution unit 13 for executing instructions as decoded by the instruction decoding unit 12, and an executable instruction extracting unit 14.

A compressed/executable instruction correspondence table 7 is input to the executable instruction extracting unit reconfiguration unit 9. The executable instruction extracting unit reconfiguration unit 9 serves to reconfigure the executable instruction extracting unit 14 on the basis of the compressed/executable instruction correspondence table 7.

FIG. 2 shows an exemplary table of the compressed/executable instruction correspondence table 7.

Executable object code 110 having been compressed is input to a main memory 101.

FIG. 2 shows an example of assemble code corresponding to the executable object code 110.

The executable instruction extracting unit 14 is designed to be reconfigurable by external means and serves to convert the constituent compressed instructions into the corresponding sequence of executable instructions by extending the respective compressed instructions. For example, in the case that the processor 151 is fixedly designed, the executable instruction extracting unit 14 is composed of a Field Programmable Gate Array (FPGA), Programmable Logic Array and so forth. Alternatively, in the case that the processor 151 is defined by a class Hardware Description Languages (HDL) or a class of Description Languages for CAD or Netlist with the restriction conditions posed thereto and a variety of configuration files, the description, i.e., the configuration itself of the executable instruction extracting unit 14 is assumed to be given to allow reconfiguration.

FIGS. 4A and 4B show an example of source code of HDL to describe the executable instruction extracting unit 14. The HDL used in Verilog, which is one of the representative HDLs. Also, the same figures show an example that two compressed instructions, each of which consists of two executable instructions as illustrated in FIG. 2, are defined.

The file as illustrated in FIG. 4C is prepared and included by the name of "compress_extend_table" in line 3 of the source code as illustrated in FIG. 4A, and therefore the files as illustrated in FIGS. 4A, 4B and 4C are complied in order to construct the executable instruction extracting unit 14.

The executable instruction extracting unit reconfiguration unit 9 serves to perform reconfiguration of the executable instruction extracting unit 14 by rewriting the file as illustrated in FIG. 4C which is included in the file as illustrated in FIGS. 4A and 4B.

Also, the file as illustrated in FIGS. 4A and 4B itself can be rewritten to perform reconfiguration of the executable instruction extracting unit 14. Namely, if the "module extender" is included in the HDL description as the definition of the entirety of the processor 151, the included "module extender" is recognized as the executable instruction extracting unit 14 and therefore the process of generating the entirety of the "module extender" is recognized as the reconfiguration of the executable instruction extracting unit 14.

Next, the executable instruction extracting unit 14 will be explained in the case that it is implemented by an FPGA.

The FPGA is composed of a plurality of cells arranged within the chip. Each cell in turn is composed of combination of a plurality of F/Fs (flip-flops) and switches functioning as logics. The cells are arranged in a matrix array in the form of a grid with interconnection wirings between adjacent cells, i.e, across bars of the grid on which the switches are located in order to determine how to interconnect the respective cells. The information of the configuration of the interconnection is input in the form of packets, and the corresponding configuration is maintained as long as the electric power is being supplied. In other words, some packet is input in order to determine the states of the switches within a certain cell corresponding to a required logic while another packet is input in order to determine the states of the switches located on the interconnection between one cell and wirings. After the states of all the switches have been determined, the configuration of the FPGA is maintained.

In accordance with the present invention, an FPGA is formed within the same processor which is provided with I/O pins through which packets can be input in order to implement the reconfigurable portion of the executable instruction extracting unit 14.

Next, referring to FIG. 5 and FIG. 6, expansion of the compressed instruction into the corresponding executable instructions will be explained.

Figure 5:
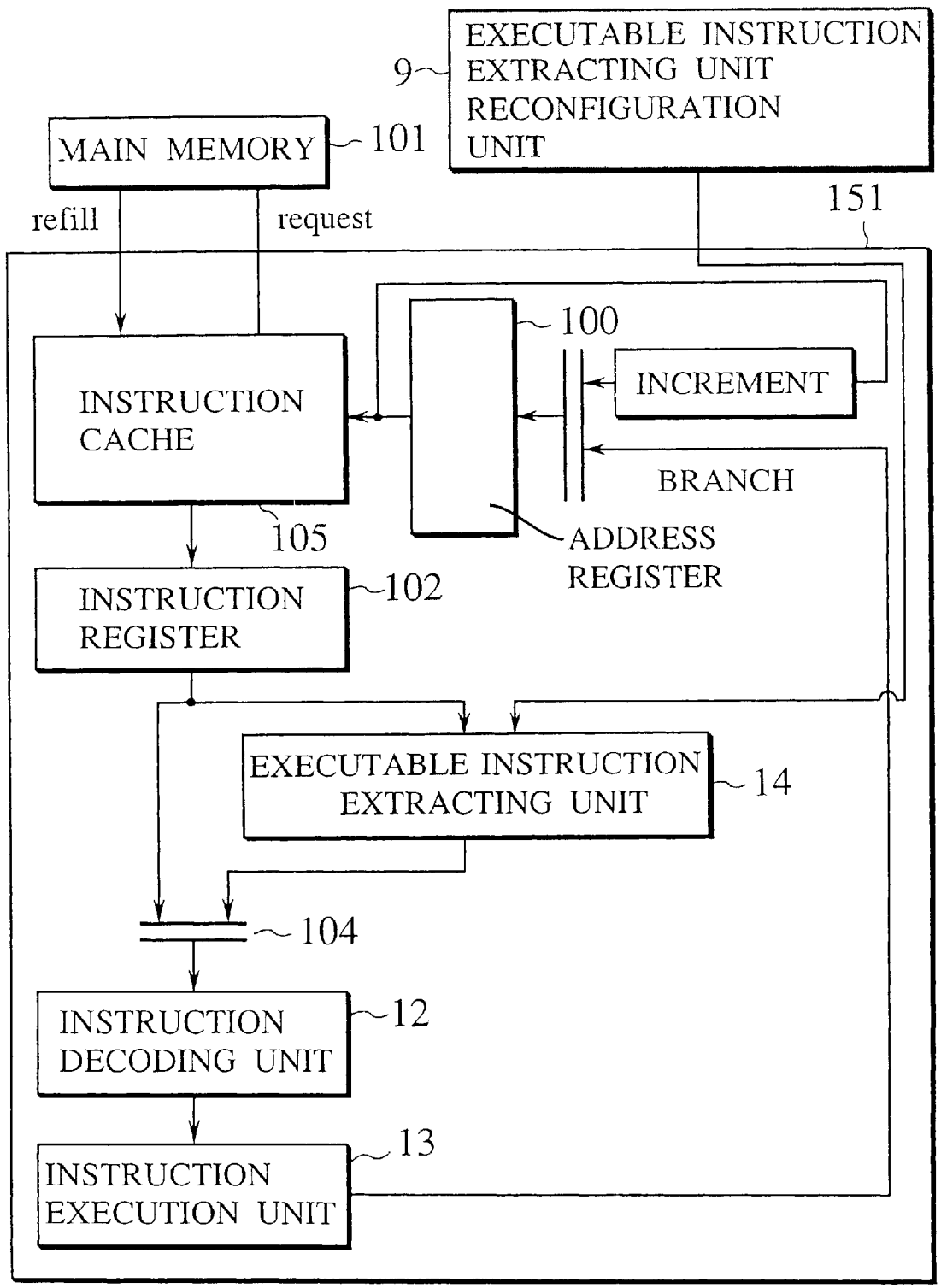
FIG. 5 is a block diagram showing an exemplary system comprising the processor and the main memory as illustrated in FIG. 1.

FIG. 5 shows a block diagram showing the connection relationship among the address register 100, the main memory 101, the instruction register 102, the multiplexer 104, the instruction cache 105, the instruction decoding unit 12, the instruction execution unit 13 and the executable instruction extracting unit 14 in accordance with the first embodiment.

In FIG. 5, each instruction as pointed by the address register 100 and fetched from the instruction cache 105 or the main memory 101 is either a executable instruction or a compressed instruction. In the case of a executable instruction, it is latched by the instruction register 102 and then transferred to the instruction decoding unit 12 through the multiplexer 104 in order to decode the executable instruction. On the other hand, in the case of a compressed instruction, it is extended into the corresponding executable instructions and then sequentially transferred to the instruction decoding unit 12 through the multiplexer 104 in order to decode the executable instructions.

Figure 6:
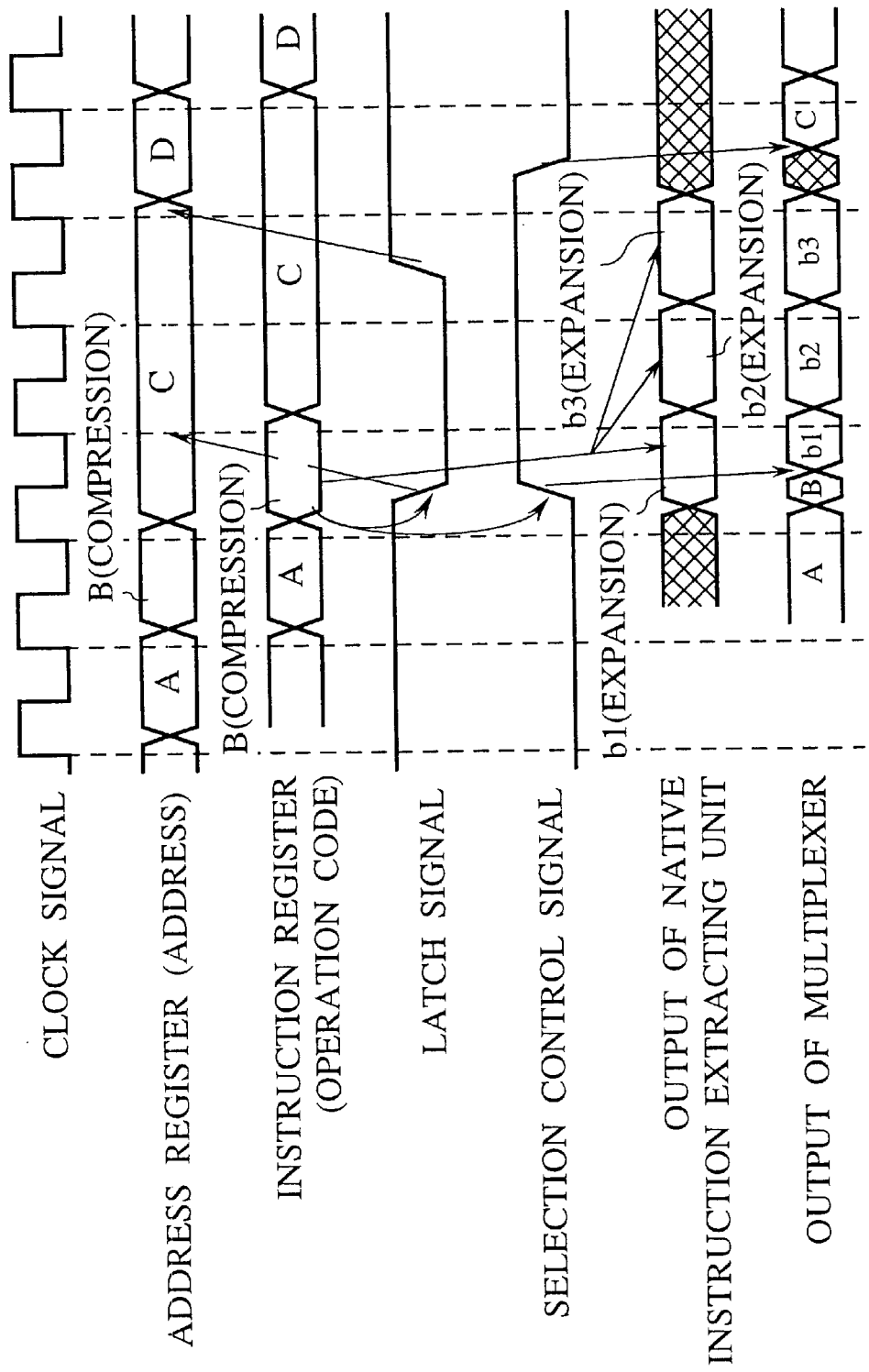
FIG. 6 is an operational timing chart of signals within a processor.

FIG. 6 shows an operational timing chart of fetching executable and compressed instructions and decoding them.

As illustrated in FIG. 6, the executable instruction extracting unit 14 serves to extend a compressed instruction B into the corresponding executable instructions b1, b2 and b3 while it transmits control signals to the multiplexer 104 in order to input to the instruction decoding unit 12 an instruction A, the instruction b1, the instruction b2 and the instruction b3 in this order in synchronism with clocks, while it transmits control signals to the address register 100 to maintain the content thereof in order that the executable instruction C next to the compressed instruction B is supplied to the instruction decoding unit 12 just after the instruction b3.

In order to extend the compressed instruction B into the corresponding executable instructions b1, b2 and b3 and transferred in the appropriate order as illustrated in FIG. 6 by appropriate hardwired control, the executable instruction b1 is directly output; the executable instruction b2 is output through one flip-flop; and the executable instruction b3 is output through two flip-flops.

As explained above, in accordance with the first embodiment, the executable instruction extracting unit 14 is reconfigured on the basis of the compressed/executable instruction correspondence table 7 in order to extend each compressed instruction contained in the executable object code 110 as compressed into the corresponding executable instructions, which are then decoded by means of the instruction decoding unit 12 and executed by means of the instruction execution unit 13.

When the executable object code 110 as compressed is replaced by new executable object code as compressed, the executable instruction extracting unit 14 is reconfigured on the basis of a new compressed/executable instruction correspondence table for the new compressed instructions contained in the new executable object code. The executable instruction extracting unit 14 as reconfigured serves to extend each new compressed instruction into the corresponding executable instructions, which are then decoded by means of the instruction decoding unit 12 and executed by means of the instruction execution unit 13.

As explained above, in accordance with the first embodiment, the executable instruction extracting unit is optimally reconfigured for the respective target program so that the number of the constituent instructions can be suppressed, resulting in compaction of the storage region for storing the target program.

While the compressed instructions are input to the executable instruction extracting unit 14 from the main memory 101 located external to the processor through the instruction cache 105 and the instruction register 102 in the case of the first embodiment, as follows.

The compressed instructions are input to the executable instruction extracting unit from a main memory located external to the processor through the instruction register internal to the processor.

The compressed instructions are input to the executable instruction extracting unit from a ROM located external to the processor through the instruction register internal to the processor.

The compressed instructions are input to the executable instruction extracting unit from a main memory located external to the processor through an instruction SRAM internal to the processor and the instruction register internal to the processor.

The compressed instructions are input to the executable instruction extracting unit from a ROM located external to the processor through the instruction cache internal to the processor and the instruction register internal to the processor.

The compressed instructions are input to the executable instruction extracting unit from a ROM located external to the processor through an instruction SRAM internal to the processor and the instruction register internal to the processor.

The compressed instructions are input to the executable instruction extracting unit from a ROM located internal to the processor through the instruction register internal to the processor.

Usually, the memory space defined by the address available in an instruction SRAM is divided into two banks. For example, instructions are transferred to the bank 1 of the SRAM from the main memory under Direct Memory Access control while the instructions saved in the bank 2 of the SRAM are transferred to the executable instruction extracting unit from the bank 2 of the SRAM through the instruction register. When the execution of the instructions saved in the bank 2 of the SRAM has been finished, the banks of the SRAM are switched. Namely, the address range accessed under Direct Memory Access control and the address range accessed by the instruction register are switched followed by the similar operation.

[Embodiment 2]

Figure 7:
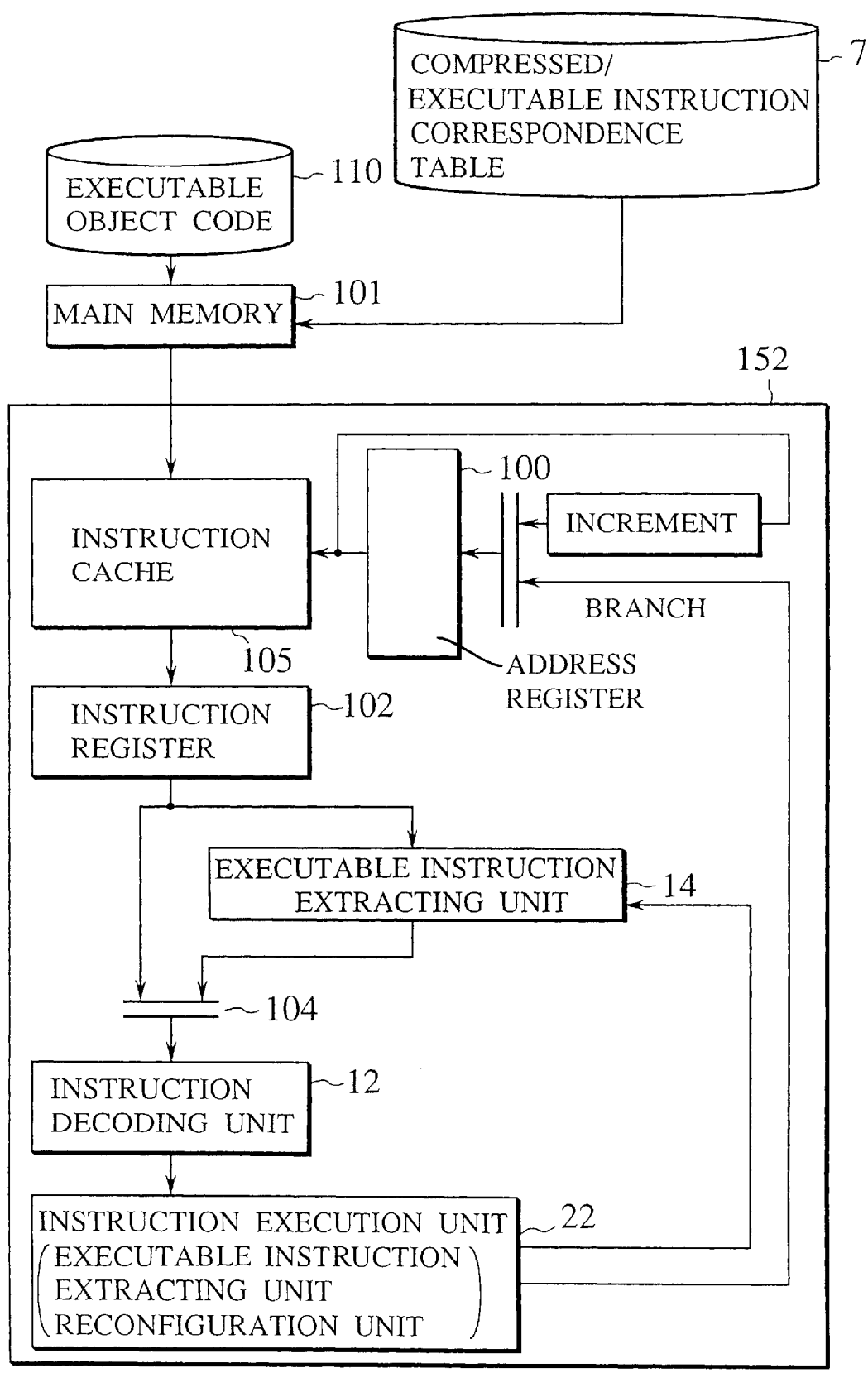
FIG. 7 is a block diagram showing an information processing apparatus in accordance with a second embodiment of the present invention.

Next, a second embodiment of the present invention will be explained with reference to FIG. 7. As illustrated in the same figure, the differences of the second embodiment from the first embodiment resides in that an instruction execution unit 22 functions also as the executable instruction extracting unit reconfiguration unit 9 and serves to reconfigure the executable instruction extracting unit 14 on the basis of the compressed/executable instruction correspondence table 7. While the other constituents elements have the same structures and functions of the previous embodiment, detailed explanation is not repeated.

The compression/expansion correspondence table 7 can be referred to by several procedures, for example, by defining compressed instructions for all or part of the entries with operands registered in the compression/expansion correspondence table 7 while the executable instruction extracting unit reconfiguration unit 9 is formed with one or more instruction sequences as illustrated in FIG. 9. Also, in accordance with another of the alternative techniques for referring to the compression/expansion correspondence table 7, the table 7 is written in the main memory 101 or a data SRAM located inside of the processor and referred to by means of a load instruction and so forth. Furthermore, in accordance with a further one of the alternative techniques for referring to the compression/expansion correspondence table 7, the instruction execution unit 22 is designed to incorporate the table 7 within itself.

In the case that the instruction execution unit 22 is designed to incorporate the compression/expansion correspondence table 7 within itself, it is implemented in the same manner as the executable instruction extracting unit 14 is reconfigured.

Also in accordance with the second embodiment of this design, there are similar advantages as in the first embodiment.

[Embodiment 3]

Next, a third embodiment of the present invention will be explained with reference to FIGS. 8 to 15.

Figure 8:
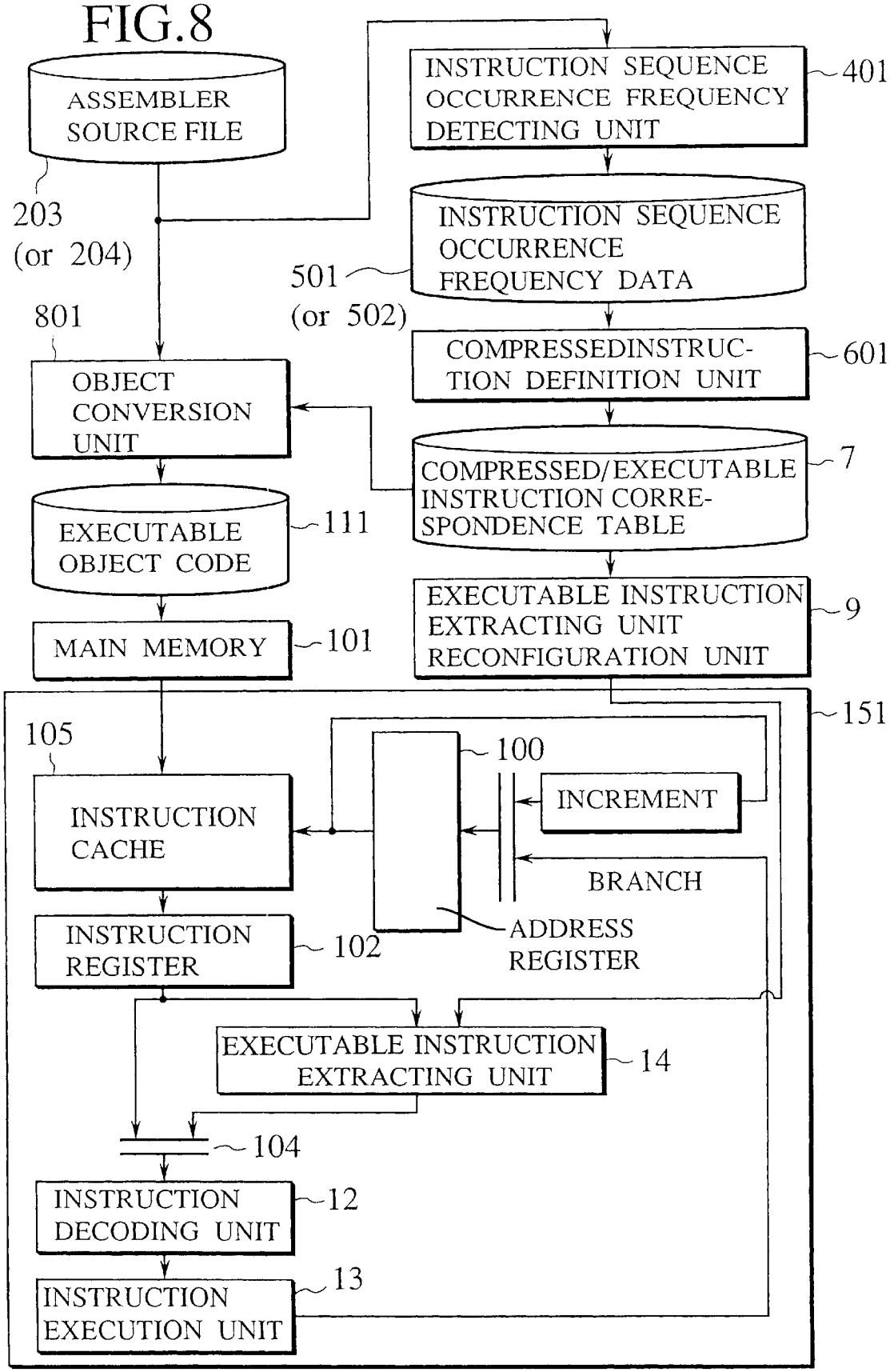
FIG. 8 is a block diagram showing an information processing apparatus in accordance with a third embodiment of the present invention.
Figure 11:
FIG. 11 shows an example of the assembler source file corresponding to the executable object code as compressed.

FIG. 8 shows a schematic diagram showing the overall configuration of the third embodiment. The differences of the third embodiment from the first embodiment resides in that the compressed/executable instruction correspondence table 7 is generated by an instruction sequence occurrence frequency detecting unit 401 and a compressed instruction definition unit 601 and that executable object code 111 is generated by an object conversion unit 801.

FIG. 9 illustrates an assembler source file 203 and instruction sequence occurrence frequency data 501. With reference to the same figure, the instruction sequence occurrence frequency detecting unit 401 will be explained.

The instruction sequence occurrence frequency detecting unit 401 serves to obtain the occurrence frequency of the instruction sequences contained in the assembler source file 203 by comparing each adjacent pair of the executable instructions contained therein.

For example, from the instruction on the first line of the assembler source file 203, i.e, sll r2, r2, 16 and the instruction on the second line, i.e, lw r3, 0(r2), the instruction sequence of sll r2, r2, 16 and lw r3, 0(2)

is counted as the occurrence frequency=1.

Also, from the instruction on the second line of the assembler source file 203, i.e, lw r3, 0(r2)

and the instruction on the third line, i.e, lw r3, 0(5)

the instruction sequence of lw r3, 0(r2) and lw r3, 0(5)

is counted as the occurrence frequency=1.

The occurrence frequency of the instruction sequence of the third line and the fourth line and the occurrence frequency of the instruction sequence of the fourth line and the fifth line are counted respectively in the same manner.

Next, the instruction on the fifth line, i.e, sll r2, r2, 16 is identical to the instruction on the first line while the instruction on the sixth line, i.e, lw r3, 0(r2)

is identical to the instruction on the second line.

Accordingly, the instruction sequence of sll r2, r2, 16 and lw r3, 0(2)

is counted as the occurrence frequency=2

The instruction sequence occurrence frequency data 501 is generated in this manner.

For example, the instruction sequence of sll r2, r2, 16 lw r3, 0(r2)

is compressed as a compressed instruction as "compress_inst_0 r2, r3"0 and registered in the compressed/executable instruction correspondence table 7.

Figure 10:
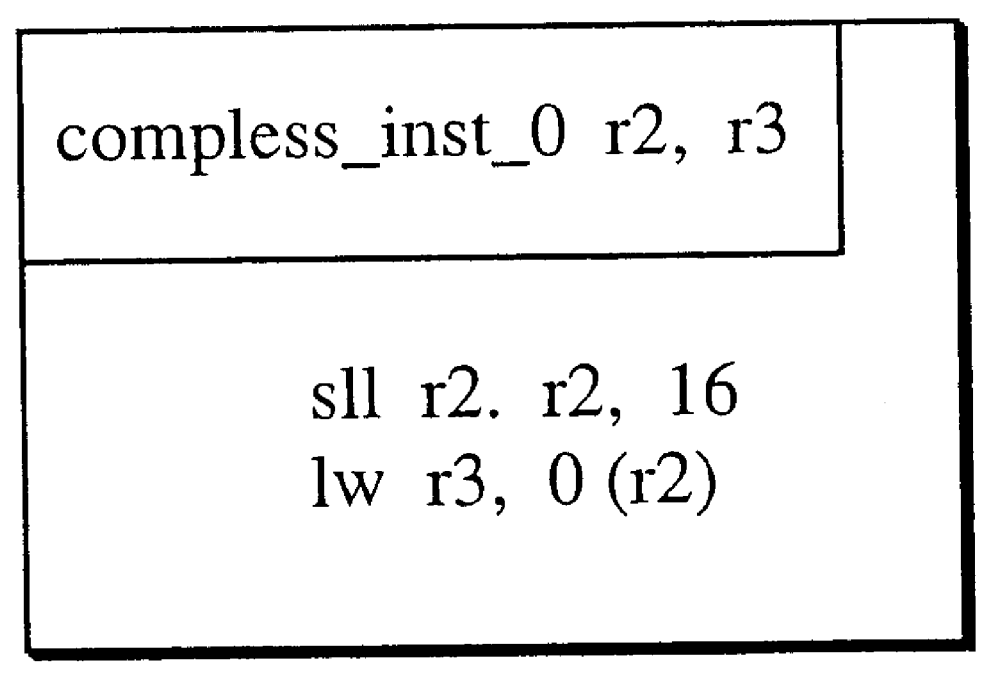

FIG. 10 shows an example of the compressed/executable instruction correspondence table 7. The assembler source file is compressed on the basis of the compressed/executable instruction correspondence table 7 in order to generate an assembler source file as compressed. FIG. 10 shows an example of the assembler source file as compressed.

Next, an exemplary modification of the instruction sequence occurrence frequency detecting unit 401 will be explained.

Namely, the instruction sequence occurrence frequency detecting unit 401 serves to modify the value of a field of an instruction contained in the instruction sequence as detected under the condition that the result of execution of the executable program is not influenced by the modification, and as a result if the instruction sequence as detected is identical to one of the instruction sequences previously detected, the occurrence frequency of said one of the instruction sequences is counted up.

More specifically speaking with reference to FIG. 12, when the instructions on the first and second lines of the assembler source file 204 are taken into consideration, the register r2 appearing twice as operands in the instruction on the first line appears again as an operand in the instruction on the second line and therefore these operands are commonly labeled rA while the register r3 appearing as an operand in the instruction on the second line is labeled rB.

The instruction on the first line of the assembler source file 203, i.e, sll r2, r2, 16 and the instruction on the second line, i.e, lw r3, 0(r2), are then represented by the instruction sequence of sll rA, rA, 16 and lw rB, 0(rA)

which is then counted as the occurrence frequency=1.

Also, the instructions on the fifth and sixth lines are expressed by the instruction sequence of sll rA, rA, 16 lw rB, 0(rA)

which is then counted as the occurrence frequency=1 in the same manner.

Furthermore, the register r9 appearing as an operand in the instruction on the eighth line and the instruction on the ninth line is labeled rA. The instructions on the eighth and ninth lines are expressed also by the instruction sequence of sll rA, rA, 16 lw rB, 0(rA)

which is then counted as the occurrence frequency=3.

The instruction sequence of the instruction on the sixth line, i.e, lw r3, 0(r2)

and the instruction on the seventh line, i.e, addu r3, r3, r2 and the instruction sequence of the instruction on the ninth line, i.e, lw r3, 0(r9)

and the instruction on the tenth line, i.e, addu r3, r3, r9 are commonly expressed by the instruction sequence of lw rA, 0(rB)

addu rA, rA, rB which is then counted as the occurrence frequency=2.

The instruction sequence of the instruction on the eleventh line, i.e, mult r4, r7, r4 and the instruction on the twelve line, i.e, sra r4, r4, 15 and the instruction sequence of the instruction on the fifteenth line, i.e, mult r3, r7, r3 and the instruction on the sixteenth line, i.e, sra r3, r3, 15 are commonly expressed by the instruction sequence of mult rA, rB, rA sra rA, rA, 15 which is then counted as the occurrence frequency=2.

The remaining instruction sequences are counted as the occurrence frequency=1. The instruction sequence occurrence frequency data 502 as illustrated in FIG. 12 is obtained in this manner.

As a result, two instruction sequences of sll rA, rA, 16 lw rB, 0(rA)

and mult rA, rB, rA sra rA, rA, 15 as illustrated in FIG. 13 and one instruction sequence of lw rA, 0(rB)

addu rA, rA, rB as illustrated in FIG. 14 are the candidates of the compressed instructions.

In the case that the requirement of defining compressed instructions is the occurrence frequency of the corresponding sequence of executable instructions is determined as no smaller than 2, the above three candidates are defined as the compressed instructions.

On the other hand, in the case that the requirement of compressed instructions is the occurrence frequency of the corresponding sequence of executable instructions is no smaller than 3, only the candidate of sll rA, rA, 16 lw rB, 0(rA)

is defined as the compressed instruction.

The compressed instructions may be given arbitrary mnemonics distinctive from each other, for example, compress_inst_1 rA, rB={sll rA, rA, 16; lw rB, 0(rA)} compress_inst_2 rA, rB={lw rA, 0(rB); addu rA, rA, rB} compress_inst_3 rA, rB={mult rA, rB, rA; sra rA, rA, 15}

Meanwhile, in the case that there is a executable instruction contained in a plurality of candidates of compressed instructions, the compressed instruction as actually defined has to be selected with reference to the occurrence frequencies thereof.

More specifically speaking, the instruction on the ninth line, i.e, lw r3, 0(r9)

is contained in two candidates of compressed instructions, i.e, compress_inst_1 rA, rB={sll rA, rA, 16; lw rB, 0(rA)} compress_inst_2 rA, rB={lw rA, 0(rB); addu rA, rA, rB} and therefore the candidate having a higher occurrence frequency, i.e, compress_inst_1 rA, rB={sll rA, rA, 16; lw rB, 0(rA)} is defined as a compressed instruction while the other candidate, i.e, compress_inst_2 rA, rB={lw rA, 0(rB); addu rA, rA, rB} is not defined as a compressed instruction.

FIG. 13 shows the assembler source file obtained by compressing the assembler source file 204 as illustrated in FIG. 12 on the basis of the compressed/executable instruction correspondence table 7.

Furthermore, the format of the compressed instructions is desirably defined in order that the bit width of the compressed instructions is equal to the bit width of the respective instructions contained in the instructions sequence as compressed.

The advantages of the same bit width are as follows. In the case of RISC (Reduced Instruction Set Computer) processors, the improvement of the processing speed (i.e., elevation of the operational frequency) is implemented partly by simplifying the instruction fetch control and the decoding control. One of the measures of the simplification is the fixed bit width of the instructions. By this configuration, the operation code and the register number can be directly accessed from fixed positions of the instruction register without particular operation, and therefore, the hardwired operation can be accelerated by the time of the access operation. Alternatively, while the present invention is related to the compression of the instruction sequences, the bit width of the compressed instructions may be designed shorter than the bit width of the respective instructions contained in the instructions sequence as compressed, depending upon the case. However, taking into consideration the tradeoff made between the high speed operation and the compression, it may be effective to maintain the bit width of the compressed instructions in order to cope with the specification required of the application program.

Also, the instruction sequence occurrence frequency detecting unit 401 serves to modify the order of instructions contained in the instruction sequence as detected under the condition that the result of execution of the executable program is not influenced by the modification, and as a result if the instruction sequence as detected is identical to one of the instruction sequences previously detected, the occurrence frequency of said one of the instruction sequences is counted up.

For example, either of the instruction sequence of addu r1,r2,r3 addu r4,r5,r6 and the instruction sequence of addu r4,r5,r6 addu r1,r2,r3 can be inversed in order to arrange the same order.

Also in accordance with the third embodiment of this design, there are similar advantages as in the first embodiment. Furthermore, the compressed/executable instruction correspondence table 7 suitable for the respective executable program can be quickly and easily generated by means of the instruction sequence occurrence frequency detecting unit 401 and the compressed instruction definition unit 601. Furthermore, the executable program 10 having been compressed can be quickly and easily generated by means of the compressed/executable instruction correspondence table 7.

[Embodiment 4]

Next, a fourth embodiment of the present invention will be explained.

FIG. 1 shows a block diagram showing an information processing apparatus in accordance with a fourth embodiment of the present invention. The differences of the fourth embodiment from the third embodiment reside in that an instruction sequence occurrence frequency detecting unit 403 serves to generate an instruction sequence occurrence frequency data 508 by the use of an instruction sequence pattern templates 3.

The instruction sequence pattern templates 3 are templates which are registered in advance the patterns of the compressed instructions and the corresponding sequences of executable instructions to be compressed together with the formats of the compressed instructions for compressing the corresponding sequences of executable instructions. The compressed instructions may be given arbitrary mnemonies distinctive from each other, for example, compress_inst_1, compress_inst_2, compress_inst_3, . . . Furthermore, the format of the compressed instructions may be defined in order that he bit width of the compressed instructions is equal to the bit width of the respective instructions contained in the instructions sequence as compressed.

The instruction sequence occurrence frequency detecting unit 403 referrs to the instruction sequence pattern templates 3 and compares the instruction sequences contained in the executable object code 2 of the target program desired to run by the processor 151 with the instruction sequence pattern as registered in the instruction sequence pattern templates 3 by a pattern matching algorithm in order to detect instruction sequence patterns and obtain the occurrence frequency thereof and the instruction sequence occurrence frequency data 503.

Also in this case, the instruction sequence occurrence frequency detecting unit 403 serves to modify the value of a field of an instruction contained in the instruction sequence as detected under the condition that the result of execution of the executable program is not influenced by the modification, in the same manner as the instruction sequence occurrence frequency detecting unit 401, and as a result if the instruction sequence as detected is identical to one of the instruction sequences previously detected, the occurrence frequency of said one of the instruction sequences is counted up.

Furthermore, the instruction sequence occurrence frequency detecting unit 403 serves to modify the order of instructions contained in the instruction sequence as detected under the condition that the result of execution of the executable program is not influenced by the modification, in the same manner as the instruction sequence occurrence frequency detecting unit 401, and as a result if the instruction sequence as detected is identical to one of the instruction sequences previously detected, the occurrence frequency of said one of the instruction sequences is counted up.

The compressed instruction definition unit 6 referrs to the instruction sequence occurrence frequency data 503 as obtained by the instruction sequence occurrence frequency detecting unit 403, defines compressed instructions by selecting instruction sequences having occurrence frequencies higher than a predetermined value on the basis of the instruction sequence occurrence frequency data 503 and then generate the compressed/executable instruction correspondence table 7 indicative of the correspondence between the compressed instructions as defined with reference to the instruction sequence pattern templates 3 and the sequences of executable instructions corresponding to the compressed instructions.

FIG. 17 shows an example of the instruction sequence pattern templates 3. The instruction sequence pattern template supports up to three compressed instructions compatible with the instruction pattern as illustrated and corresponding to instruction sequences each composed of two executable instructions.

FIG. 18 illustrates examples of an assembler source file 203 and instruction sequence occurrence frequency data corresponding to the executable object code 2. When searching the instruction sequences as illustrated in FIG. 17, i.e., the instruction sequences having up to two operands, among from the instruction sequences contained in the assembler source file 201, the instruction sequence occurrence frequency data 503 as illustrated in FIG. 18 is obtained.

In this case, "the compression of the instruction sequence composed of two executable instructions" is for example such that the instruction on the first line of sll r4, r4, 16 and the instruction on the first line of lw r7, 0(r4)

constitutes the instruction sequence of sll r4, r4, 16 lw r7, 0(r4)

which is compressed.

Also, "the instruction sequence having up to two operands" is for example such that the instruction sequence composed of the instruction on the first line and the instruction on the second line, i.e., sll r4, r4, 16 lw r7, 0(r4)

has two operands of r4 and r7 so that it is an instruction sequence of this kind. However, the instruction sequence composed of the instruction on the second line and the instruction on the third line, i.e., lw r7,0(r4)

lw r3,0(r5)

has four operands of r3, r4, r5 and r7 so that it is not an instruction sequence of this kind.

The candidates of the instruction sequences for definition of compressed instructions are selected on the basis of the instruction sequence occurrence frequency data in order to generate the compressed/executable instruction correspondence table 7 as illustrated in FIG. 13.

The object conversion unit 8 serves to generate the executable object code 112 as compressed by referring to the compressed/executable instruction correspondence table 7 generated by the compressed instruction definition unit 6 and converting the sequences of executable instructions to be compressed into the corresponding compressed instructions. The object conversion unit 8 also serves to store the executable object code 112 as compressed in the main memory 101.

The executable instruction extracting unit reconfiguration unit 9 serves to reconfigure the executable instruction extracting unit 14 in order that the compressed instructions as defined are extended into the corresponding executable instructions with reference to the compressed/executable instruction correspondence table 7 generated by the compressed instruction definition unit 6.

In the case that the executable instruction extracting unit 14 is implemented by an FPGA, the executable instruction extracting unit reconfiguration unit 9 corresponds to the configurator of the FPGA while in the case that the executable instruction extracting unit 14 is defined in terms of a description of HDL, the executable instruction extracting unit reconfiguration unit 9 is implemented by a conversion filter which converts the description to an HDL description corresponding to the compressed/executable instruction correspondence table 7. Also, the executable instruction extracting unit reconfiguration unit 9 serves to delete the compressed instructions previously implemented from the executable instruction extracting unit 14.

In this configuration, the instruction sequence as registered in the instruction sequence pattern template 3 are detected in the executable object code 2 which runs in the processor 151. The instruction sequences as detected are selectively defined as compressed instructions in accordance with the occurrence frequencies thereof. The compressed/executable instruction correspondence table 7 is generated by the compressed instruction definition unit 6 on the basis of the compressed instructions as defined and the corresponding sequence of executable instructions. On the basis of the compressed/executable instruction correspondence table 7 as generated, the executable instruction extracting unit 14 is reconfigured by means of the executable instruction extracting unit reconfiguration unit 9. Also, on the basis of the compressed/executable instruction correspondence table 7, the sequences of executable instructions within the executable object code 2 is converted into the corresponding the compressed instructions as defined in order to generate the executable object code 112 as compressed, which is then stored in the main memory 101. The executable object code 112 stored in the main memory 101 are extended into the corresponding executable instructions, which are sequentially decoded by the instruction decoding unit 12 for execution. On the other hand, when other executable object code than the previous executable object code is to run, the executable instruction extracting unit 14 is reconfigured by the executable instruction extracting unit reconfiguration unit 9 after defining the compressed instruction in the same manner as explained above, and then the new executable object code 112 as compressed is run.

In this manner, in accordance with the fourth embodiment, the compressed instructions can be optimally defined for the respective target program running on the same processor so that the number of the constituent instructions can be suppressed, resulting in compaction of the memory 101 for storing the target program.

[Embodiment 5]

Figure 19:
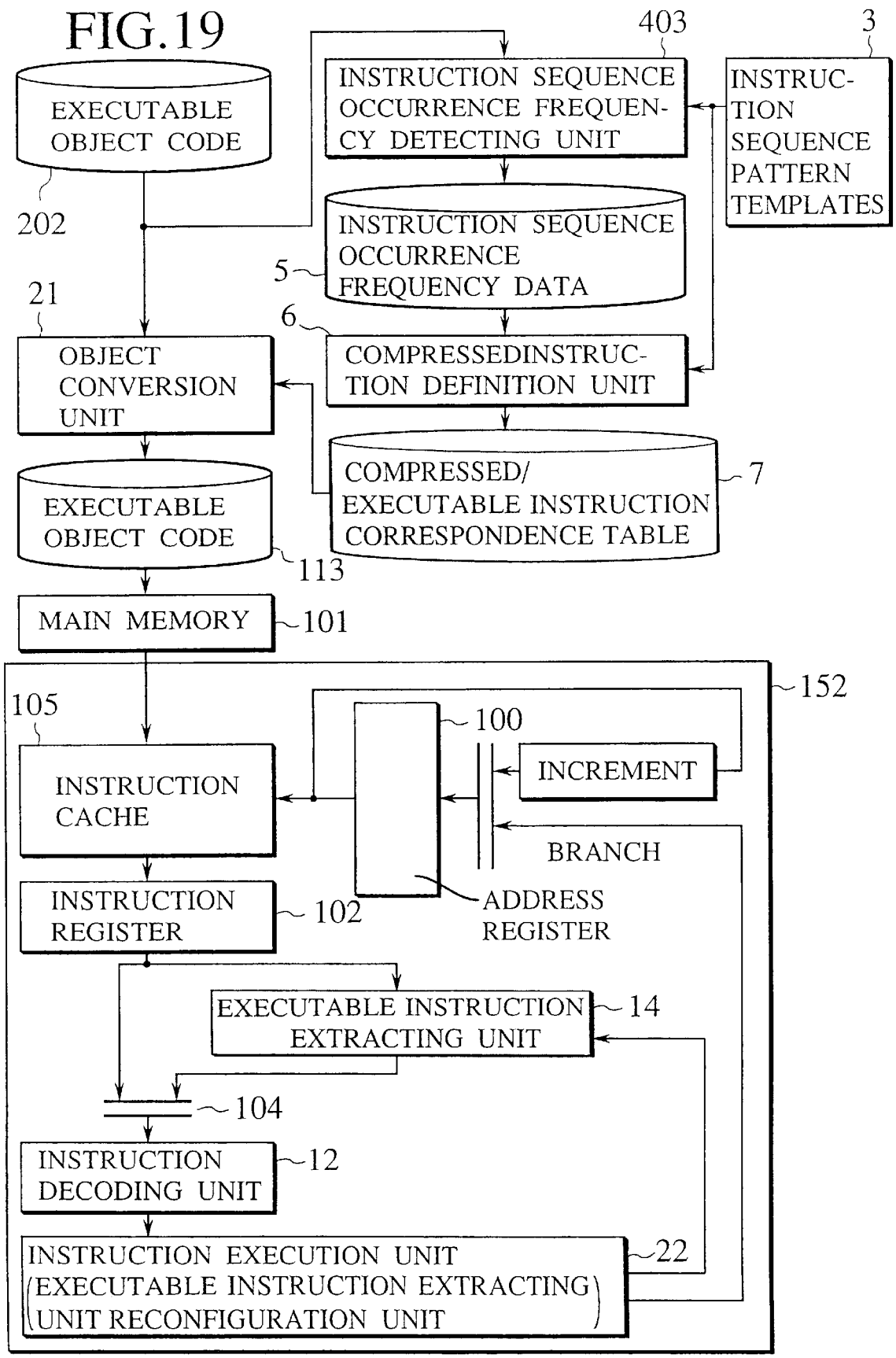
FIG. 19 shows a block diagram showing an information processing apparatus in accordance with a fifth embodiment of the present invention.

Next, a fifth embodiment of the present invention will be explained. FIG. 19 shows a block diagram showing an information processing apparatus in accordance with the fifth embodiment.

Figure 16:
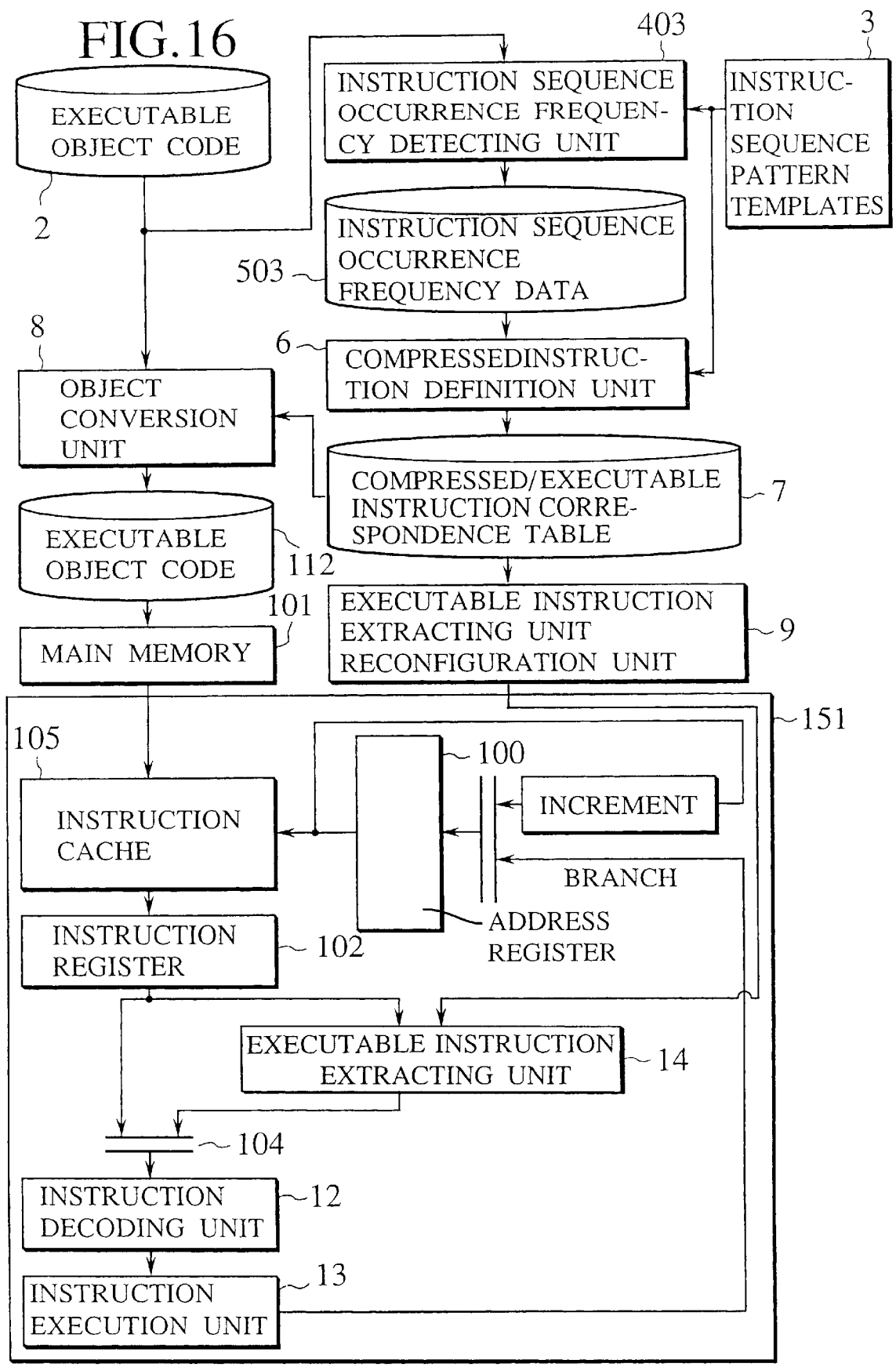
FIG. 16 shows a block diagram showing an information processing apparatus in accordance with a fourth embodiment of the present invention.

In contrast to the information processing apparatus as illustrated in FIG. 16, the apparatus as illustrated in FIG. 19 is characterized in that the target program for running on the processor 1 is defined and given in the form of the assembler source file 202 as illustrated in FIG. 20A rather than executable object code and that an object code generation unit 21 is provided in place of the object conversion unit 8 as illustrated in FIG. 16 in order to convert the sequence of executable instructions contained in the assembler source file to the corresponding compressed instruction on the basis of the compressed/executable instruction correspondence table 7 while the instruction execution unit 22 functions also as the executable instruction extracting unit reconfiguration unit 9 as illustrated in FIG. 16 for reconfiguring the executable instruction extracting unit 14 with reference to the compressed/executable instruction correspondence table 7. While the other constituents elements have the same structures and functions of the previous embodiment, detailed explanation is not repeated.

FIG. 21 illustrates an example of the instruction sequence occurrence frequency of the assembler source file 202. The compressed/executable instruction correspondence table 7 generated on the basis of the instruction sequence occurrence frequency data 5 is, for example, as illustrated in FIG. 22A on the basis of which the assembler source file is converted in order to include the compressed instructions as defined.

In this manner, the present invention is not depending upon the representation of the original instruction code and whether or not the executable instruction extracting unit reconfiguration unit 9 is implemented inside or outside of the processor.

Also in accordance with this embodiment of this design, there are similar advantages as in the fourth embodiment.

What is claimed is:

1. An information processing apparatus comprising:
   an instruction sequence occurrence frequency detecting means for detecting occurrence frequencies of patterns of sequences of executable instructions in an executable program;
   a compressed instruction definition means for selecting a sequence of executable instructions to be compressed on the basis of the occurrence frequencies as detected by the instruction sequence occurrence frequency detecting unit, defining a compressed instruction of the sequence of executable instructions as selected, and generating a compressed/executable instruction correspondence table indicative of the correspondence between the compressed instruction as defined and the sequence of executable instructions corresponding to the compressed instruction;
   a conversion means for converting the sequence of executable instructions contained in the executable program into the corresponding compressed instruction on the basis of the compressed/executable instruction correspondence table as generated by the compressed instruction definition unit;
   an executable instruction extracting means for extending the compressed instruction contained in the executable program into the sequence of corresponding executable instructions in advance of decoding the executable program; and
   a reconfiguration means for reconfiguring the executable instruction extracting means on the basis of the compressed/executable instruction correspondence table in order that the compressed instruction as defined is extended into the sequence of the corresponding executable instructions by means of the executable instruction extracting unit.

2. The information processing apparatus as claimed in claim 1 wherein the reconfiguration means includes an instruction execution means for executing instructions as decoded.

3. The information processing apparatus as claimed in claim 2 further comprising:
   an instruction sequence pattern template in which are registered the pattern of the instruction sequence to be compressed (the sequence of executable instructions) and a format of the corresponding compressed instruction as compressed,
   wherein the instruction sequence occurrence frequency detecting means serves to search the pattern of the sequence of executable instructions as registered and detects the occurrence frequency thereof; and
   the compressed instruction definition unit serves to select the pattern of the sequence of executable instructions to be compressed on the basis of the occurrence frequency as detected by the instruction sequence occurrence frequency detecting means, defining a compressed instruction corresponding to the sequence of executable instructions as selected, and generating a compressed/executable instruction correspondence table indicative of the correspondence between the compressed instruction as defined and the sequence of executable instructions corresponding to the compressed instruction.

4. The information processing apparatus as claimed in claim 3 wherein the instruction sequence occurrence frequency detecting means serves to modify at least one of the value of a field of an instruction contained in the instruction sequence as detected and the order of instructions contained in the instruction sequence as detected under the condition that the result of execution of the executable program is not influenced by the modification, and as a result if the instruction sequence is identical to an instruction sequence previously detected in the executable program, the occurrence frequency of the previously detected instruction sequence is counted up.

5. The information processing apparatus as claimed in claim 2 wherein the instruction sequence occurrence frequency detecting means serves to modify at least one of the value of a field of an instruction contained in the instruction sequence as detected and the order of instructions contained in the instruction sequence as detected under the condition that the result of execution of the executable program is not influenced by the modification, and as a result if the instruction sequence as detected is identical to an instruction sequence previously detected in the executable program, the occurrence frequency of the previously detected instruction sequence is counted up.

6. The information processing apparatus as claimed in claim 1 further comprising:

an instruction sequence pattern template in which are registered a pattern of the instruction sequence to be compressed (the sequence of executable instructions) and a format of the corresponding compressed instruction, wherein the instruction sequence occurrence frequency detecting means serves to search the pattern of the sequence of executable instructions as registered and detects the occurrence frequency thereof and the compressed instruction definition means serves to select the pattern of the sequence of executable instructions to be compressed on the basis of the occurrence frequency as detected by the instruction sequence occurrence frequency detecting means, defining a compressed instruction corresponding to the sequence of executable instructions as selected, and generating a compressed/ executable instruction correspondence table indicative of the correspondence between the compressed instruction as defined and the sequence of executable instructions corresponding to the compressed instruction.

7. The information processing apparatus as claimed in claim 6 wherein the instruction sequence occurrence frequency detecting means serves to modify at least one of the value of a field of an instruction contained in the instruction sequence as detected and the order of instructions contained in the instruction sequence as detected under the condition that the result of execution of the executable program is not influenced by the modification, and as a result if the instruction sequence as detected is identical to an instruction sequence previously detected in the executable program, the occurrence frequency of the previously detected instruction sequence is counted up.

8. The information processing apparatus as claimed in claim 1 wherein the instruction sequence occurrence frequency detecting means serves to modify at least one of the value of a field of an instruction contained in the instruction sequence as detected and the order of instructions contained in the instruction sequence as detected under the condition that the result of execution of the executable program is not influenced by the modification, and as a result if the instruction sequence as detected is identical to an instruction sequence previously detected in the executable program, the occurrence frequency of the previously detected instruction sequence is counted up.

9. The information processing apparatus as claimed in claim 1 wherein the bit width of the respective instructions contained in the instruction sequence as compressed is equal to the bit width of the compressed instructions.

10. The information processing apparatus as claimed in claim 1 wherein the executable instruction extracting means is composed of a Field Programmable Gate Array (FPGA).

11. The information processing apparatus as claimed in claim 1 wherein the executable instruction extracting means is designed in Hardware Description Language (HDL).

12. An information processing apparatus comprising:

(a) an instruction sequence occurrence frequency detecting unit configured to:
obtain a first line instruction, a second line instruction, a third line instruction, a fourth line instruction and a fifth line instruction in an executable program;
count a first occurrence frequency of a first instruction sequence comprising the first line instruction and the second line instruction as 1;
compare the first instruction sequence with a second instruction sequence comprising the second line instruction and the third line instruction;
count up the first occurrence frequency if the first instruction sequence is identical to the second instruction sequence;
compare the first instruction sequence with a third instruction sequence comprising the third line instruction and the fourth line instruction;
count up the first occurrence frequency if the first instruction sequence is identical to the third instruction sequence;
compare the first instruction sequence with a fourth instruction sequence comprising the fourth line instruction and the fifth line instruction; and
count up the first occurrence frequency if the first instruction sequence is identical to the fourth instruction sequence;

(b) a compressed instruction definition unit configured to:
receive the first occurrence frequency from the instruction sequence occurrence frequency detecting unit;
compare the first occurrence frequency with a threshold value;
define a first compressed instruction corresponding to the first instruction sequence if the first occurrence frequency is more than the threshold value; and
generate a compressed/executable instruction correspondence table indicative of a correspondence between the first compressed instruction and the first instruction sequence;

(c) a conversion unit configured to:
receive the compressed/executable instruction correspondence table from the compressed instruction definition unit; and
convert the first instruction sequence contained in the executable program into the first compressed instruction on the basis of the compressed/executable instruction correspondence table;

(d) an executable instruction extracting unit configured to extend the first compressed instruction contained in the executable program into the first instruction sequence in advance of decoding the executable program; and (e) a reconfiguration unit configured to reconfigure the executable instruction extracting unit on the basis of the compressed/executable instruction correspondence table in order that the first compressed instruction is extended into the first instruction sequence by means of the executable instruction extracting unit.

* * * * *